(12) United States Patent
Thrush

(10) Patent No.: US 9,645,013 B2
(45) Date of Patent: May 9, 2017

(54) THERMOMETER USER INTERFACE

(71) Applicant: Helen of Troy Limited, St. Michael (BB)

(72) Inventor: Rich Thrush, Jersey City, NJ (US)

(73) Assignee: Helen of Troy Limited, St. Michael (BB)

( * ) Notice: Subject to any disclaimer, the term of this patent is extended or adjusted under 35 U.S.C. 154(b) by 476 days.

(21) Appl. No.: 14/210,568

(22) Filed: Mar. 14, 2014

(65) Prior Publication Data

US 2014/0269832 A1 Sep. 18, 2014

Related U.S. Application Data

(60) Provisional application No. 61/791,478, filed on Mar. 15, 2013.

(51) Int. Cl.
| | |
|---|---|
| *G01J 5/02* | (2006.01) |
| *G01K 1/02* | (2006.01) |
| *G01K 1/08* | (2006.01) |
| *G01K 15/00* | (2006.01) |
| *G01K 13/00* | (2006.01) |

(52) U.S. Cl.
CPC ............ *G01K 1/028* (2013.01); *G01K 1/083* (2013.01); *G01K 1/086* (2013.01); *G01K 13/002* (2013.01); *G01K 15/002* (2013.01)

(58) Field of Classification Search
CPC combination set(s) only.
See application file for complete search history.

(56) References Cited

U.S. PATENT DOCUMENTS

| | | | |
|---|---|---|---|
| 5,920,394 A | 7/1999 | Gelbart et al. | |
| 7,854,550 B2 | 12/2010 | Chan et al. | |
| 8,126,672 B2 * | 2/2012 | Yamaguchi | G01J 5/02 374/121 |
| 8,271,197 B2 | 9/2012 | Fogarty et al. | |

(Continued)

OTHER PUBLICATIONS

PCT International Search Report and Written Opinion from PCT/US14/27013, mailed on Jul. 28, 2014.

(Continued)

*Primary Examiner* — Harshad R Patel
*Assistant Examiner* — Nasir U Ahmed
(74) *Attorney, Agent, or Firm* — Stroock & Stroock & Lavan LLP

(57) ABSTRACT

At least one indicator light is located on the body or probe sections of a thermometer to indicate to the user that adjustments should be made to the timing or probe cover positioning of the thermometer. Additionally or alternatively the thermometer retains and displays information from previous uses, and in particular displays information pertaining to how long ago the last temperature measure was taken. Additionally, the thermometer may include additional buttons which can function to toggle the display to provide various types of information to the user, or toggle between thermometer usage modes, icon display, and LED color, among others. In another aspect, an internal body section with an access door provides access to a button allowing the user to toggle the interface of the thermometer, such as whether the temperature output is in degrees Fahrenheit or degrees Centigrade.

15 Claims, 4 Drawing Sheets

(56) References Cited

U.S. PATENT DOCUMENTS

| | | | |
|---|---|---|---|
| 2007/0135717 A1* | 6/2007 | Uenishi | A61B 5/02208 |
| | | | 600/485 |
| 2007/0185390 A1* | 8/2007 | Perkins | A61B 5/0002 |
| | | | 600/300 |
| 2007/0242726 A1 | 10/2007 | Medero | |
| 2011/0009722 A1* | 1/2011 | Amundson | A61B 5/14551 |
| | | | 600/324 |
| 2011/0118623 A1 | 5/2011 | Nakanishi et al. | |
| 2012/0150482 A1 | 6/2012 | Yildizyan et al. | |
| 2012/0303313 A1* | 11/2012 | Moroi | C23C 16/45525 |
| | | | 702/134 |

OTHER PUBLICATIONS

Partial Supplementary European Search Report issued on Jan. 16, 2017 in European Patent Application No. 14768010.2.

* cited by examiner

THERMOMETER USER INTERFACE

CROSS-REFERENCE TO RELATED APPLICATIONS

This application claims the benefit of U.S. Provisional Application No. 61/791,478, filed Mar. 15, 2013, the contents of which are incorporated herein by reference.

BACKGROUND OF THE INVENTION

1. Field of the Invention

The present invention relates to an electronic thermometer for detecting and visually displaying body temperatures. More particularly, the present invention pertains to a clinical thermometer with one or more advanced user interface features.

2. Description of the Related Art

Multiple types of thermometers exist, including hand-held electronic thermometers and glass-tube mercury thermometers. Glass-tube mercury thermometers have gradated scales colored or etched into the glass tube and once the mercury rises and settles in the glass tube due to the temperature of the patient, a user can read the temperature from the scale, calibrated for degrees Fahrenheit or Centigrade. Glass-tube thermometers have a number of drawbacks, including the difficulty of reading a temperature from the gradated scale based on the mercury level.

As an improvement, hand-held electronic thermometers have been introduced. In a basic electronic thermometer design, a temperature-sensing element is connected to a combined, battery-powered computing and display element. The display element is typically a viewing window provided for the temperature display wherein the temperature is displayed numerically in either degrees Fahrenheit or Centigrade. The display element can include, for example, a multi-segment liquid crystal display (LCD), which are simple to read and can provide a digital readout of the patient's temperature.

However, regardless of the method used to display a patient's temperature, many of the interface features present in current electronic thermometers leave the device crowded, confusing and often difficult to use, presenting results that are difficult to interpret. Additionally, while an electronic thermometer may be easier to read than a glass-tube thermometer, it can still be difficult to read for those with poor vision. Furthermore, those with poor vision may have difficulty pressing buttons or properly aligning features, such as a probe cover. Users also have trouble pushing the button when required or tend to remove or insert the thermometer at the wrong times.

Thus, there remains a need for low cost, easy to read, easy to interpret, visual displays and improved user interface configurations for clinical thermometers.

SUMMARY OF THE INVENTION

Various embodiments of the present invention provide an electronic thermometer comprising an improved user interface for maximizing additional thermometer features as well as ease of use. A particular embodiment of the invention includes an electronic thermometer having a temperature-sensing element connected to a powered processor and to a display which are collectively housed in a case having a probe section and a body section. This embodiment also features a power/initialization button for starting or resetting the thermometer and in some embodiments, a light-emitting diode (LED) light-source for providing backlighting or illumination to the power/initialization button to indicate starting and wakeup sequences, or to provide the user with an indication that some action is necessary. Another embodiment of the invention includes at least one LED indicator light located on the body or probe sections to indicate to the user that adjustments should be made to the timing or probe cover positioning of the thermometer.

One embodiment of the invention includes a processor configured to retain and display information from previous uses. For example, the thermometer may function to display information pertaining to how long ago the last temperature measure was taken to help with an understanding of a patient's trending temperature profile. Such a display might indicate, for example, "18 hrs ago" when the last temperature measurement was taken 18 hours prior. Additionally, one embodiment of the invention may include additional buttons located on the body or probe section which can function to toggle the display to provide various types of information to the user, or toggle between thermometer usage modes, icon display, and LED color, among others. This feature allows the user to depress the buttons and thereby quickly display information regarding the last temperature measurement without navigating user-interface menus.

One embodiment of the invention includes an internal body section with an access door providing access to internal features of the thermometer, such as a battery. One internal feature includes a button allowing the user to toggle the interface of the thermometer, such as whether the temperature output is in degrees Fahrenheit or degrees Centigrade. Another embodiment of the invention includes a thermometer with a charging station.

A specific embodiment thermometer comprises a case having a probe section and a body section. A processor is disposed within the case. A temperature sensing element is disposed within the probe section and coupled to the processor. A display is disposed in the body section and coupled to the processor. At least one positioning sensor is disposed in the probe section and is configured to determine a position of a probe cover installable onto the probe section. The positioning sensor is coupled to the processor. An indicator is disposed on the case to indicate misalignment of the probe cover and is controllable by the processor. A memory is coupled to the processor and includes program code that is configured to cause the processor to process signals from the temperature sensing element, display a corresponding temperature value on the display, and process signals from positioning sensor to determine if the probe cover is properly aligned on the probe section and to control the indicator to indicate to a user a direction of misalignment of the probe cover.

In certain embodiments the positioning sensor determines the position of the probe cover according to a plurality of quadrants of the probe section. The indicator includes a corresponding number of quadrants, and the program code causes the processor to control the indicator to indicate in which quadrant the direction of misalignment of the probe cover occurs.

In various embodiments the memory stores a corresponding measurement time of a previous temperature measurement and the processor controls the display to display the previous temperature measurement and how long ago the previous temperature measurement was taken based upon the measurement time stored in the memory. Alternatively, or in addition, the processor controls the display to display the previous temperature measurement and the time corresponding to the measurement time stored in the memory.

In various other embodiments the case further comprises an access door for covering a compartment, and a switch is disposed within the compartment and coupled to the processor to cause the processor to control whether a temperature displayed on the display is shown in degrees Fahrenheit or degrees Centigrade.

In yet other embodiments a user interface of the thermometer changes according to whether or not a probe cover is disposed on the probe section, such as by the positioning sensor detecting the presence or lack thereof of a probe cover.

In yet other embodiments the display also includes a plurality of icons to indicate which one of a plurality of age groups is selected, and the processor controls the display according to the selected age group.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION OF THE PREFERRED EMBODIMENTS

Figure 1A:
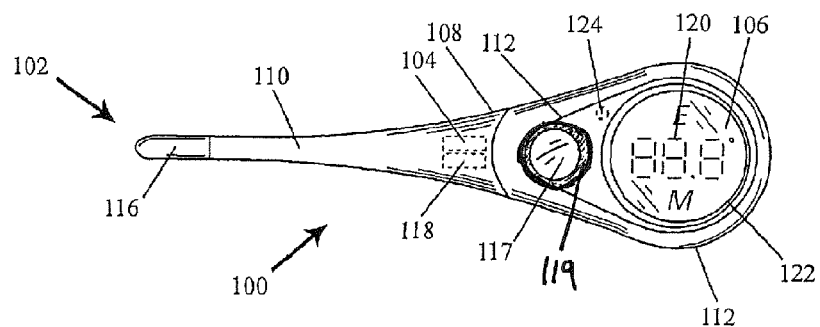
FIG. 1A is a top view of a thermometer according to an embodiment of the present invention.

Referring to FIG. 1A, an embodiment of an electronic thermometer 100 is illustrated, which may be used to determine the temperature of a living being. A temperature sensing element 102 is connected to a powered processor 104 that is used to control a display 106. The processor 104 is controlled by program code stored in memory 118, as known in the art, to obtain the functionality described in the following. The temperature sensing element 102 may be any suitable temperature sensing device known in the art, such as a thermocouple, a thermistor or the like. The components are housed in a case 108 having a probe section 110 and a body section 112. In this embodiment, the case 108 is preferably plastic and preferably rigid. The temperature sensing element 102 is mounted at the distal end of the probe section 110. The body section 112 can also include a power/initialization button 117 communicatively coupled to the processor 104 or a power control switch.

The power/initialization button 117 functions to activate the thermometer 100 or reset it for a subsequent reading. The power/initialization button 117 may further include a lighting element, such as an LED 119 to provide a backlight emitting feature to the button 117. This LED 119 may be activated when the unit is turned on and the thermometer 100 enters a wakeup sequence before transitioning into a normal operating mode. In alternative embodiments, the LED 119 may light to indicate when during the sequence that the power/initialization button 117 should be pressed, such as to reset the thermometer for a subsequent reading, or to utilize data from an insertion sensor (not shown) or computer data from a computer input (not shown).

The processor 104 receives signals from the temperature sensing element 102 related to the temperature of the living being, i.e., the patient. The processor 104 converts the signals to a temperature in either degrees Fahrenheit or Centigrade as known in the art. The processor 104 may also use memory 118 for storing ranges of temperatures and corresponding colors and/or adjustments for the display 106. Hence, it will be appreciated that memory 118 can include both volatile and non-volatile memory. Processor 104 compares the currently-read temperature to the stored temperature ranges and adjustment values within memory 118 to determine what color to illuminate the display 106. For example, a red color may be used to indicate a fever condition where the detected temperature falls into a high range.

The display 106 can also include a liquid crystal display (LCD) 120 for displaying the actual temperature, in various degrees of precision, such as to a tenth of a degree. The body section 112 is formed with an opening or recess 122 within which the LCD 120 is disposed. In one embodiment, the LCD 120 is transparent and the user can see through LCD 120 and thus through or into the case 108. The LCD 120 can be any shape, including rectangular and octagonal and can be a "reverse" LCD. A reverse LCD may light the numerals of the display instead of the background. This increases the visibility and viewing angle of the LCD 120.

The display 106 may also include one or more lighting elements 124, which in an embodiment can be light emitting diodes (LEDs) or similar light emitting elements, and which are disposed in the display 106 peripheral to LCD 120. The lighting elements 124 may also be a backlight emitting element and may be used to backlight the display 106 to illuminate the LCD 120. Lighting elements 124 can also be used without the display 106 and be used as the sole display of a sensed temperature.

The display 106 can further include a lens that is transparent or translucent. In an embodiment, the lens can be circular, elliptical, or any other shape to form the display 106. One or more lighting elements 124 may be disposed in the display 106 and peripheral to LCD 120. The light emitting element 124 may edge-light the display 106 to illuminate the LCD 120.

Figure 1B:
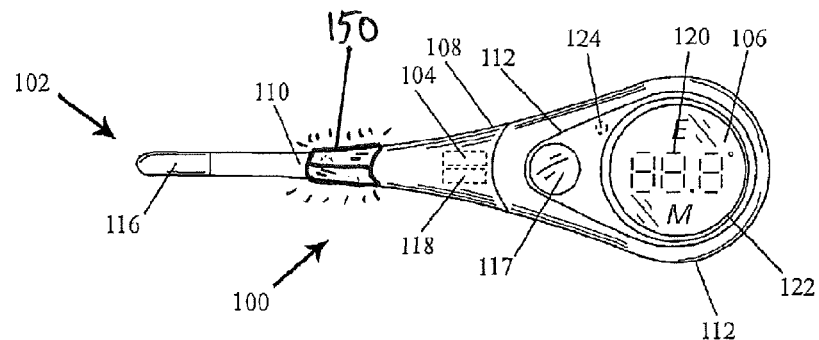
FIG. 1B is a top view of an embodiment of the thermometer including an adjustment display feature.
Figure 1C:
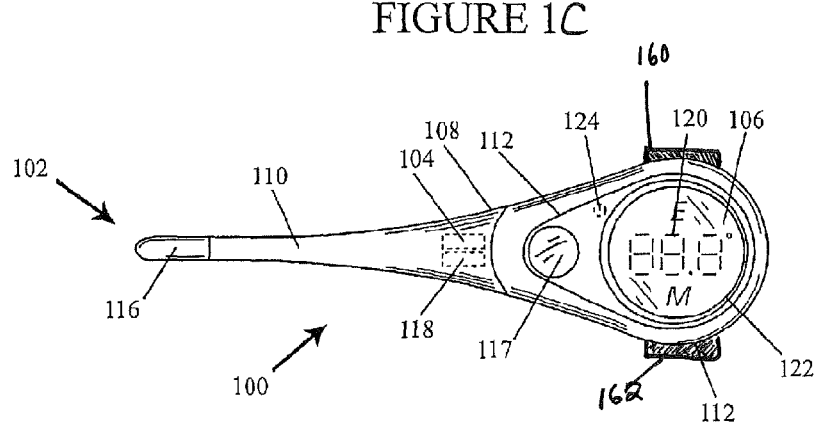
FIG. 1C is a top view of an embodiment of the thermometer including additional button features.
Figure 3A:
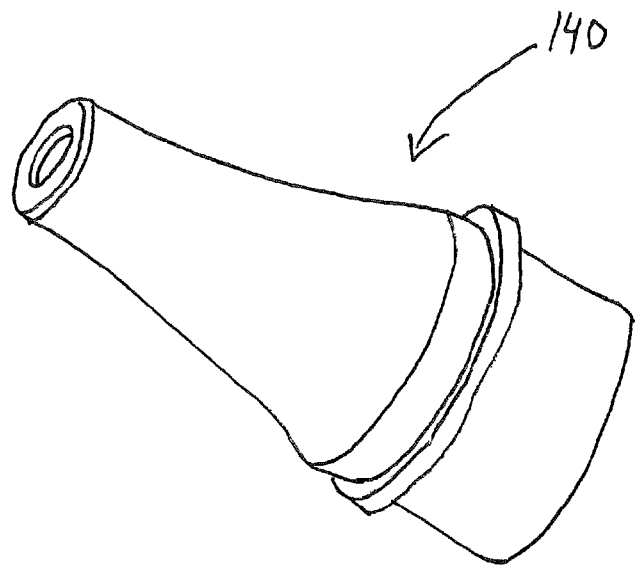
FIGS. 3A-3B are perspective views of an embodiment of a probe cover according to an embodiment of the present invention.
Figure 3B:
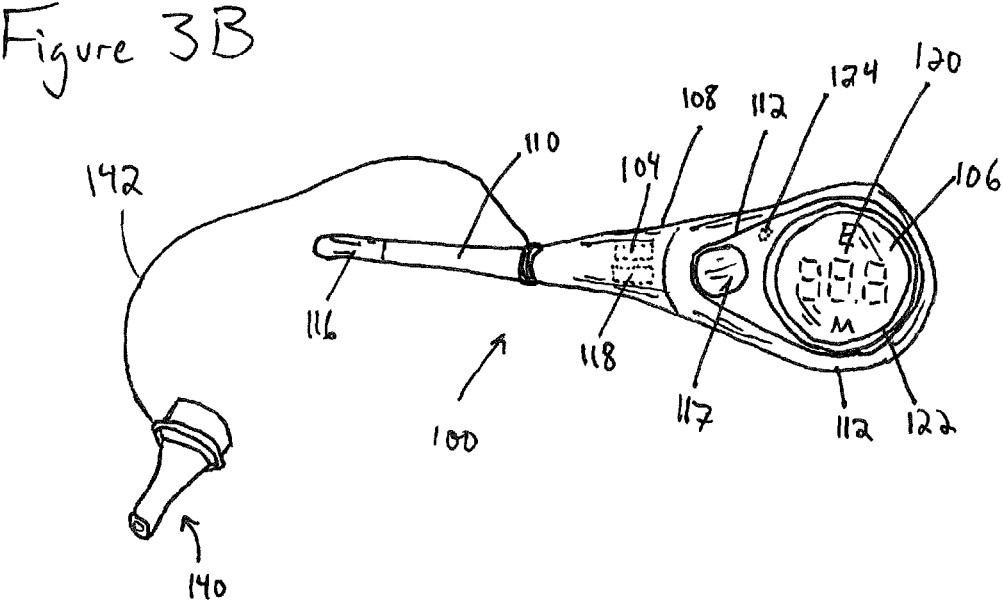

As shown in FIGS. 1A-1C, the temperature sensing element 102 is mounted at the distal end of probe section 110 and covered with a conductive cap 116. The conductive cap 116 can be, for example, metal such as nickel or stainless steel. The probe section 110 may also include a protective cap 140, for example, as shown in FIGS. 3A and 3B. The protective cap 140 functions to protect and enclose the temperature sensing element 102, conductive cap 116, and probe section 110 and may be detachable, or releasably connected by an attachment arm 142 which prevents it from being lost from the thermometer 100. The protective cap 140 may be disposable or configured for multiple uses. Additionally, a disposable probe cover may be used on the probe section 110 in order to maintain proper hygiene, such as when the thermometer 100 is used on different individuals.

In another embodiment, the user interface can change configuration when the thermometer 100 changes configuration. For example, when the protective cap 140 is put into place on the thermometer 100, such as during storage, the user interface will change modes so as to power down the thermometer 100. Some electronic thermometers can be used to take temperatures in different body locations, e.g., in the ear, on the forehead, in the axillary region, etc. Sometimes a different attachment or probe head is placed on the thermometer so as to better interface with or conform to the particular body region used for temperature-taking purposes. For example, a thermometer that is used to take a temperature measurement inside of the ear may have a detachable probe head that is sized and shaped to appropriately interface with a person's ear canal. It would benefit the user if the thermometer display would also change when a particular attachment is added or removed to display information that is only relevant to that particular mode of operation corresponding to the attachment in place.

As shown in FIG. 1B, in one embodiment, the electronic thermometer 100 may also include at least one LED indicator light 150 configured to indicate to the user adjustments that should be made when using the thermometer. These adjustments may include positioning, depth of insertion, or timing indicators. In a preferred embodiment, the LED indicator light 150 may indicate to the user that the probe cover is improperly aligned, and may specifically illuminate where the misalignment actually exists. In this embodiment, the LED indicator light 150 may be orange, but other colors may also be used. Another possible use of this LED would be to indicate that a temperature reading has already taken place with this particular probe cover in place and that the probe cover should be replaced for hygienic reasons before another temperature reading is taken.

In certain embodiments, the LED indicator light 150 is located along the probe section 110, but in alternative embodiments may be located on the body section 112. In a preferred embodiment, if the probe cover is misaligned on the left hand side of the probe section 110, the LED indicator light 150 will illuminate on the left hand side of the probe section 110. If the probe cover is misaligned on the right hand side of the probe section 110, the LED indicator light 150 will illuminate on the right hand side of the probe section 110. If the probe cover is completely detached, the LED indicator light will illuminate in the center, left and right of the probe section 110. In such embodiments, the thermometer 100 may include one or more pressure sensors, capacitive sensors or the like (which may be called positioning sensors) to determine proper placement of the probe cover. For example, such positioning sensors may be located on or within the probe section 110, including on or within conductive cap 116, to be co-located or concentric with the intended position of the probe cover. The positioning sensors can be coupled to the processor 104, and the memory 118 associated with the processor 104 may include program code designed to analyze the signals from the positioning sensors to determine the placement of the probe cover. By way of example, these positioning sensors may be broken up into quadrants around the probe section 110 where contact with the probe cover is expected, such as two or four quadrants, each with an associated positioning sensor. These signals may be processed and signals that indicate an unbalanced probe cover, for example, may be used to correspondingly light the LEDs within indicator 150 to indicate in which direction, or in which quadrant, the probe cover is misaligned. For example, if the probe section 110 is broken into four quadrants, each with an associated sensor, the indicator 150 could also include four corresponding LEDs, axially aligned with these quadrants, to indicate in which direction the probe cover should be moved for proper alignment. Further, the positioning sensors can determine when the probe cover has been inserted, removed and used in relation to taking the temperature of a patient. When a new temperature is being taken and the positioning sensors determine that the current probe cover has not been replaced in the interim, the indicator 150 can be controlled accordingly, such as by flashing, changing color or the like. Note that in such embodiments, the time that the probe cover is first installed, as well as the time of the last temperature measurement, may all be stored in the memory 118.

In one embodiment, the electronic thermometer 100 may include an animated or moving probe cover icon displayed on the LCD 120 display. This icon will "wobble" in place on the LCD display 120 to indicate to the user that the probe cover is not attached properly to the body section 112 and that it should be adjusted to correct the improper placement of the probe cover. In contrast, if the probe cover icon is still, then this indicates the probe cover is properly attached to the body section 112.

In one embodiment, the electronic thermometer 100 may include icons presented on the LCD display that allow the user to choose predetermined sets of temperature ranges corresponding to different temperature conditions for different age groups. For example, an adult's normal temperature maybe in the range of 98-99° F., elevated temperature maybe in the range of 100-101° F., and fever maybe in the range above 102° F. Conversely, a child's normal temperature may be in the in the range of 98-100° F., elevated temperature maybe in the range of 101-102° F., and fever maybe in the range above 103° F. For other age groups, (e.g. infants, seniors, ect.) there may still be yet other temperature ranges. By switching the mode to correspond to the user's age, the electronic thermometer 100 will give a better indication of the user's temperature condition. For the chosen mode, different icons may be used to visually indicate the different temperature conditions, i.e., normal, elevated, or fever.

In one embodiment, the processor 104 and memory 118 can be configured to retain and display information from previous uses. In particular, the processor 104 and memory 118 can be configured to display information pertaining to how long ago the last temperature measurement was taken. Such a display might indicate "18 hrs ago" as an example when the last temperature measurement was taken 18 hours prior; alternatively, or in addition, the date and time of the last temperature measurement can be displayed. Hence, the memory 118 can store one or more temperature and time/date pairs, and these pairs can be presented on the display 120. It will be appreciated that in such embodiments, the processor 104 can include a timer/clock, as known in the art, to keep track of the current date and time.

In one embodiment, the electronic thermometer 100 is enabled to transfer temperature information to another device through Bluetooth pairing or communication and thus includes suitable corresponding electronics, including a Bluetooth-enabled transceiver coupled to the processor 104 and supporting software executable by the processor 104 to support such communications functions and hardware.

As shown in FIG. 1C, the body section 112 can be configured with additional buttons 160, 162 on the sides of the body section 112. The additional buttons 160, 162 can be configured to signal the display 106 (such as via a signal to processor 104) to provide various types of information to the user, or to toggle between thermometer usage modes, icon displays, and LED colors, among others. In one embodiment, by pressing one button, or in another embodiment both buttons, a user can signal the LCD 120 to display the most recent temperature saved in the memory 118.

Figure 2:
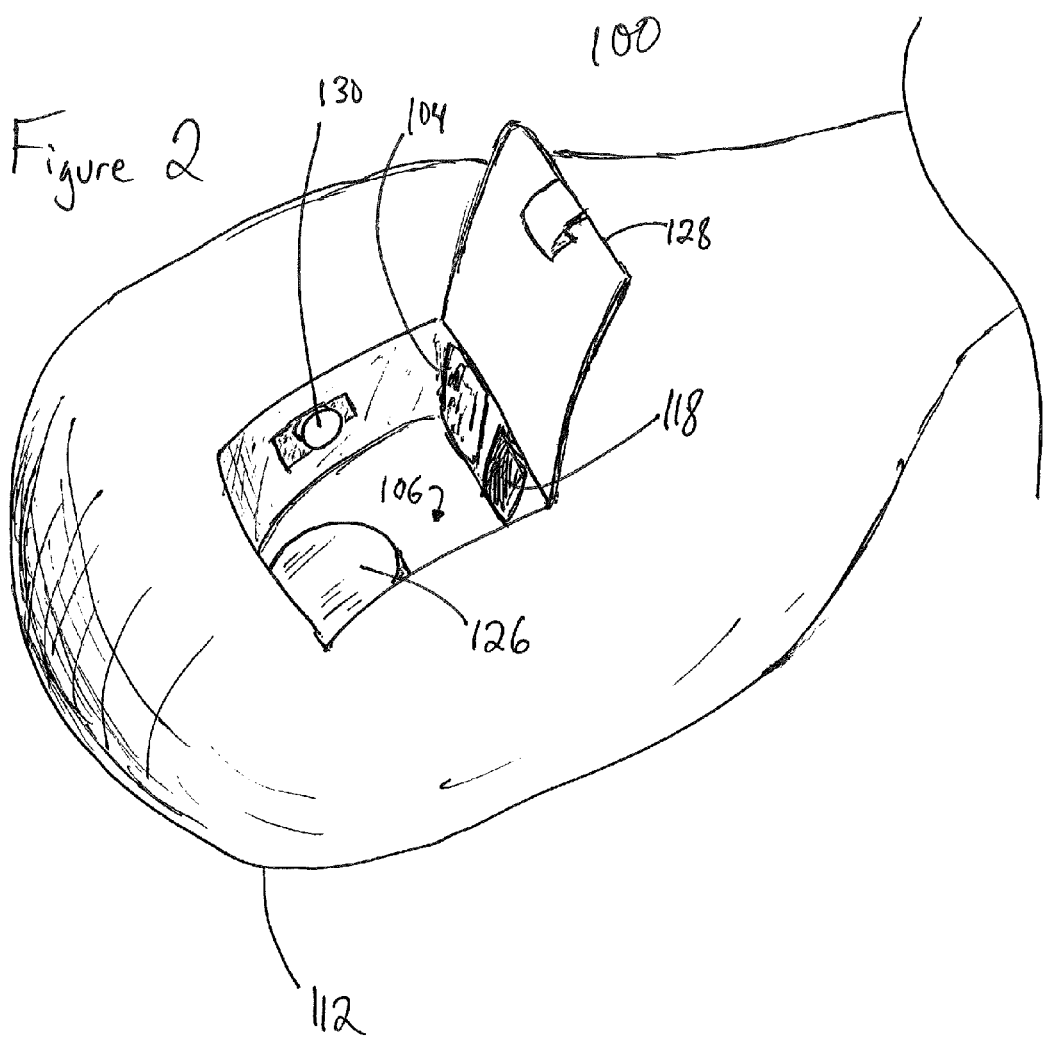
FIG. 2 is a perspective view of an embodiment of the thermometer including a battery access feature.

As illustrated in FIG. 2, the processor 104, memory 118, display 106, and battery 126, are secured in the body section 112 of case 108 along with an access door 128, which provides for access to the battery 126. In one embodiment, the body section 112 may also include at least one functional button 130 for configuring features of the electronic thermometer 100. The button 130 may be accessed by the user by opening the access door 128 and depressing or sliding the button 130.

In one embodiment, the button 130 inside the body section 112 of the electronic thermometer 100 may be configured to toggle the thermometer's output between degrees Fahrenheit and degrees Centigrade for the temperature scale, advantageously hiding the button from the exterior interface where the user may accidentally toggle the button at unwanted times. This feature is particularly useful for options that the user may not need to change or configure on a regular basis. In other embodiments, the button 130 may be used to toggle or change other features of the thermometer such as LED color, icon display, time settings, or output degree/precision, among others.

In one embodiment, the electronic thermometer 100 may include a timer of a predetermined duration, e.g., a 15 second timer, presented on the LCD 120 display. This feature is useful to physicians or other users who do not have a watch accessible to them but still wish to easily determine the patient's pulse. Therefore, this feature enables the user to count the number of pulses without concern for the number of seconds necessary to accurately determine pulse rate. In the case of a 15-second timer, pulse rate would be easily determined by multiplying the number of counted pulses by four.

Figure 4:
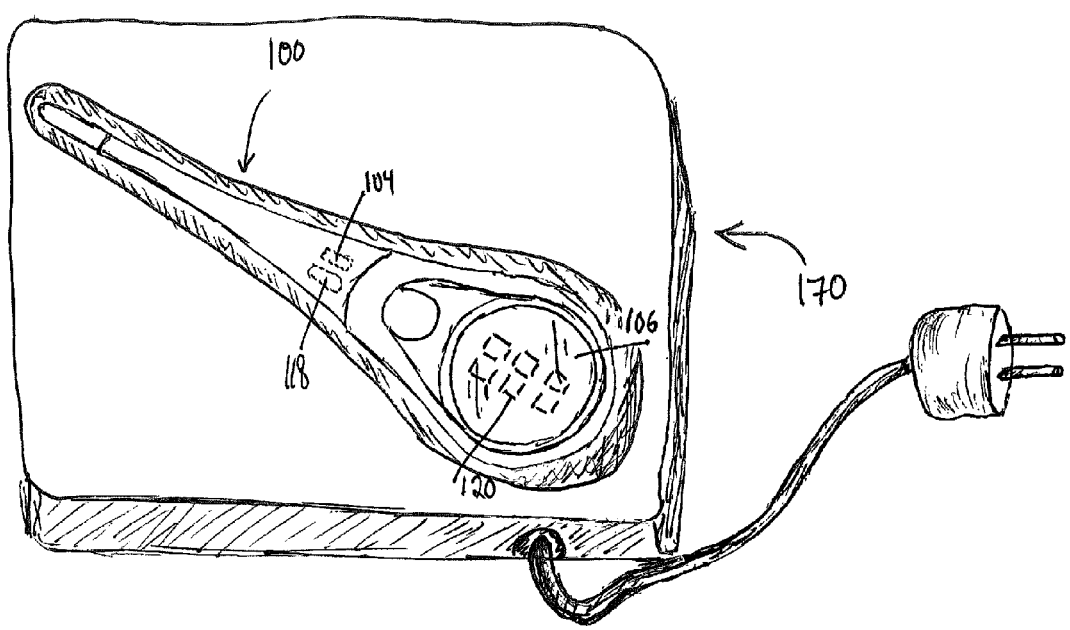
FIG. 4 is a front view of an embodiment of the thermometer including a charging station feature.

In one embodiment, as shown in FIG. 4, the electronic thermometer 100 is configured to mate with a charger or charging station 170.

In one embodiment, the electronic thermometer 100 may include an antitheft deterrent system. After a certain amount of time away from a charger or charging station 170, the electronic thermometer 100 will lock and cannot be used. This functionality can be provided by software executed by the processor 104 or by dedicated hardware that shuts down, for example, power to the processor and display. Once the electronic thermometer 100 is returned to the charger or charging station 170, the electronic thermometer 100 will unlock and can be used again.

While various features have been shown, described, and pointed out in various embodiments herein, it will be understood by those skilled in the art that all possible combinations of features and elements, including additional features and elements not mentioned herein are envisioned as possible features and elements in one or more embodiments. Furthermore, the features and elements described herein may be utilized not only in the types of thermometers illustrated, but also utilized in clinical thermometers intended to determine temperature orally, axillary (armpit), rectally, via the ear, via the forehead, or other body sites.

While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A thermometer comprising:
    a case having a probe section and a body section;
    a processor disposed within the case;
    a temperature sensing element disposed within the probe section and coupled to the processor;
    a display disposed in the body section and coupled to the processor;
    a plurality of positioning sensors disposed in the probe section and configured to determine a position of a probe cover installable onto the probe section, the at least one first positioning sensor coupled to the processor;
        an indicator disposed on the case to indicate misalignment of the probe cover; and a memory coupled to the processor and comprising program code configured to:
        process signals from the temperature sensing element and cause the display to display a corresponding temperature value; and
        process signals from the plurality of positioning sensors to determine if the probe cover is properly aligned on the probe section and to control the indicator to indicate to a user a direction of misalignment of the probe cover.

2. The thermometer of claim 1 wherein the plurality of positioning sensors determines the position of the probe cover according to a plurality of quadrants of the probe section, the indicator includes a corresponding number of quadrants, and the program code causes the processor to control the indicator to indicate in which quadrant the direction of misalignment of the probe cover occurs.

3. The thermometer of claim 1 wherein the indicator comprises a plurality of light-emitting diodes (LEDs).

4. The thermometer of claim 1 wherein for at least a previous temperature measurement the memory stores a corresponding measurement time of the previous temperature measurement, and the processor controls the display to display the previous temperature measurement and how long ago the previous temperature measurement was taken according to the measurement time stored in the memory.

5. The thermometer of claim 1 wherein for at least a previous temperature measurement the memory stores a corresponding measurement time of the previous temperature measurement, and the processor controls the display to display the previous temperature measurement and a time corresponding to the measurement time stored in the memory.

6. The thermometer of claim 1 wherein the case further comprises an access door for covering a compartment, and a switch is disposed within the compartment to control whether a temperature displayed on the display is shown in degrees Fahrenheit or degrees Centigrade.

7. The thermometer of claim 1 wherein a user interface of the thermometer changes according to whether or not the plurality of positioning sensors detects whether or not a probe cover is disposed on the probe section.

8. The thermometer of claim 1 wherein the display further includes a plurality of icons to indicate which one of a plurality of age groups is selected, and the processor controls the display according to the selected age group.

9. A thermometer comprising:
a case having a probe section having a plurality of positioning sensors and a body section;
a processor disposed within the case;
a temperature sensing element disposed within the probe section and coupled to the processor;
a display disposed in the body section and coupled to the processor; and
a memory coupled to the processor and comprising program code configured to:
process signals from the temperature sensing element and determine a corresponding temperature value;
store in the memory a measurement time corresponding to the temperature value;
store in the memory the temperature value; and
control the display to display the temperature value and how long ago the temperature value was obtained according to the measurement time stored in the memory.

10. The thermometer of claim 9 further comprising:
the plurality of positioning sensors disposed in the probe section and configured to determine a position of a probe cover installable onto the probe section, the plurality of positioning sensors coupled to the processor; and an indicator disposed on the case to indicate misalignment of the probe cover; wherein the program code is further configured to process signals from the plurality of positioning sensor to determine if the probe cover is properly aligned on the probe section and to control the indicator to indicate to a user a direction of misalignment of the probe cover.

11. The thermometer of claim 10 wherein the plurality of positioning sensors determines the position of the probe cover according to a plurality of quadrants of the probe section, the indicator includes a corresponding number of quadrants, and the program code causes the processor to control the indicator to indicate in which quadrant the direction of misalignment of the probe cover occurs.

12. The thermometer of claim 11 wherein the indicator comprises a plurality of light-emitting diodes (LEDs).

13. The thermometer of claim 9 wherein the case further comprises an access door for covering a compartment, and a switch is disposed within the compartment to control whether a temperature displayed on the display is shown in degrees Fahrenheit or degrees Centigrade.

14. The thermometer of claim 9 wherein a user interface of the thermometer changes according to whether or not a probe cover is disposed on the probe section.

15. The thermometer of claim 9 wherein the display further includes a plurality of icons to indicate which one of a plurality of age groups is selected, and the processor controls the display according to the selected age group.

* * * * *